US009936819B2

(12) United States Patent
Kessler et al.

(10) Patent No.: US 9,936,819 B2
(45) Date of Patent: Apr. 10, 2018

(54) FOLDABLE PLAY ENCLOSURES

(71) Applicants: Shawn Kessler, Rockville, MD (US);
Olivia Kessler, Rockville, MD (US);
Renee Jablow, Los Angeles, CA (US)

(72) Inventors: Shawn Kessler, Rockville, MD (US);
Olivia Kessler, Rockville, MD (US);
Renee Jablow, Los Angeles, CA (US)

(73) Assignee: Popup Holdings, LLC, Rockville, MD (US)

( * ) Notice: Subject to any disclaimer, the term of this patent is extended or adjusted under 35 U.S.C. 154(b) by 559 days.

(21) Appl. No.: 14/528,297

(22) Filed: Oct. 30, 2014

(65) Prior Publication Data
US 2015/0182035 A1 Jul. 2, 2015

Related U.S. Application Data

(60) Provisional application No. 61/922,503, filed on Dec. 31, 2013.

(51) Int. Cl.
A47D 13/06 (2006.01)
A01K 15/02 (2006.01)
A01K 1/03 (2006.01)
B65D 81/36 (2006.01)

(52) U.S. Cl.
CPC .......... A47D 13/065 (2013.01); A01K 15/025 (2013.01); B65D 81/368 (2013.01)

(58) Field of Classification Search
CPC ........ A47D 13/065; A01K 1/03; A01K 5/025; A01K 1/033; A01K 1/0125; A01K 1/035; B65D 81/368; A63H 27/001; A63H 33/16; E04H 17/18
USPC ..... 229/116.1, 103; 119/514, 702, 165, 168, 119/482, 498, 502; 5/99.1; 206/768; 446/487, 478; D21/656
See application file for complete search history.

(56) References Cited

U.S. PATENT DOCUMENTS

| 3,866,814 | A | * | 2/1975 | Bissler | B65D 5/4245 |
| | | | | | 229/116.1 |
| 4,548,352 | A | * | 10/1985 | Capo | B65D 81/368 |
| | | | | | 206/45.29 |
| 5,054,611 | A | * | 10/1991 | Russomanno | A45C 5/00 |
| | | | | | 206/45.28 |
| 5,163,381 | A | * | 11/1992 | Kraski | A01K 1/033 |
| | | | | | 119/28.5 |
| 5,544,864 | A | | 8/1996 | Gabriel-Lacki et al. | |
| 5,682,999 | A | * | 11/1997 | Larson | A63H 3/18 |
| | | | | | 206/45.28 |
| 7,404,219 | B2 | | 7/2008 | Berkey | |
| 7,594,844 | B2 | * | 9/2009 | Cartlidge | A63H 33/38 |
| | | | | | 446/148 |
| D607,281 | S | | 1/2010 | Meyers | |
| 7,703,416 | B2 | | 4/2010 | Farmer et al. | |
| 7,753,003 | B2 | | 7/2010 | Farmer et al. | |
| 8,117,993 | B2 | | 2/2012 | Farmer et al. | |

(Continued)

OTHER PUBLICATIONS

Summer Infant Travel Bed, downloaded from Amazon.com on Sep. 16, 2014. http://www.amazon.com/Summer-Infant-78210-Travel-Bed/dp/B00FBEN8X6/ref=pd_cp_ba_1.

(Continued)

Primary Examiner — Christopher Demeree

(57) ABSTRACT

An enclosure that lies flat when side panels are lowered for storage. The enclosure can have play elements for small animals or infants.

20 Claims, 10 Drawing Sheets

(56) References Cited

U.S. PATENT DOCUMENTS

| | | | |
|---|---|---|---|
| 8,746,179 B2 | 6/2014 | Farmer et al. | |
| 8,757,095 B2 | 6/2014 | Farmer et al. | |
| 2004/0094610 A1* | 5/2004 | Longo | B65D 81/368 |
| | | | 229/116.1 |

OTHER PUBLICATIONS

Nature's Miracle Port-A-Crate Dog Crate, downloaded from PetSmart.com on Sep. 16, 2014. http://www.petsmart.com/dog/crates-gates-containment/nature-s-mira...0v3O9ykciLE?var_id=36-7281&_t=pfm%3Dcategory%26pfmvalue%3Dfaceted.

Petmate Curvations Pet Retreat Carrier, downloaded from PetSmart.com on Sep. 16, 2014. http://www.petsmart.com/supplies-training/carriers/petmate-curvation...rrier-zid36-6784/cat-36-catid-100085?var_id=36-6784&_t=pfm%3Dsearch.

Portable Dog Pen, downloaded from DiscountRamps.com on Sep. 16, 2014. http://www.discountramps.com/dog-pen/p/PET-PEN-BL/?CAWELAID=122...UUSJACcdilsjFkXqVrSG6syh-quskBOkmJ_xLq752ksyBqMGFnSBoC-wjw_wcB.

Guinea Pig & Dwarf Rabbit Habitat with Play Yard. Photograph taken at PetSmart store, San Diego, California on Sep. 16, 2014.

Infant Travel Bed, downloaded from SummerInfant.com on Sep. 17, 2014. http://www.summerinfant.com/infanttravelbed.

Infantino Fold and Go Travel Bed, downloaded from Amazon.com on Sep. 16, 2014 http://www.amazon.com/infantino-Fold-Travel-Bed-baby/dp/B004KSU8EQ.

Pop Up Park Bird Toy, downloaded from Amazon.com on Sep. 17, 2014. http://www.amazon.com/Prevue-Products-22600-Park-Small/dp/B00DS4ELLE.

Pop-up Travel Doghouse, downloaded from CMYBacon on Oct. 11, 2014. http://www.cmybacon.com/2010/05/pop-up-travel-dog-house/.

MK Canvas Waterproof Dog Water Bowl, downloaded from MountainKhakis.com on Sep. 16, 2014. http://www.mountainkhakis.com/products/accessories/dog-gear/mk-c...0UUSJACcdilsHITAEdgNlh6nwVmQ0kKyW7p5igrLfU21ridPg-USWexoCfp7w_wcB.

Quencher Dog Bowl, downloaded from BambeCo.com on Sep. 16, 2014. http://www.bambeco.com/pet-bowls/ruffwear-quencher-dog-bowl.asp?...UUSJACcdils7hipLSoOaoNAXzauTIN-zH8z9pkP7ZeFbFsRIzAeVRoC6FHw_wcB.

Hello Kitty 35th Anniversary Limited Model, downloaded from tatebanko.com on Sep. 16, 2014. http://tatebanko.com/products/tbk_va/tbk_0012/index.html.

Pop-Up Playland Kickstarter Video, published Feb. 21, 2014, downloaded from YouTube.com on Oct. 29, 2014. https://www.youtube.com/watch?v=ZOvFTJEc-n0.

\* cited by examiner

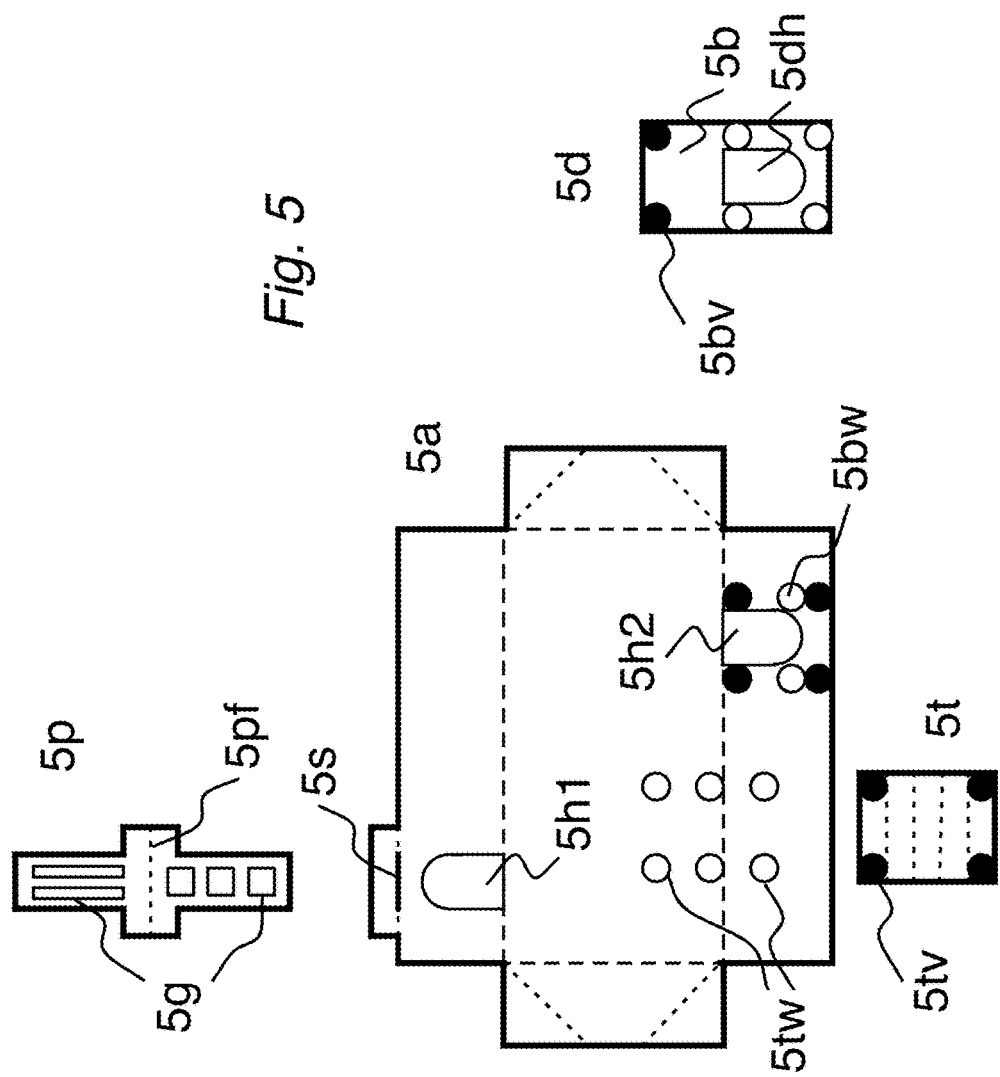

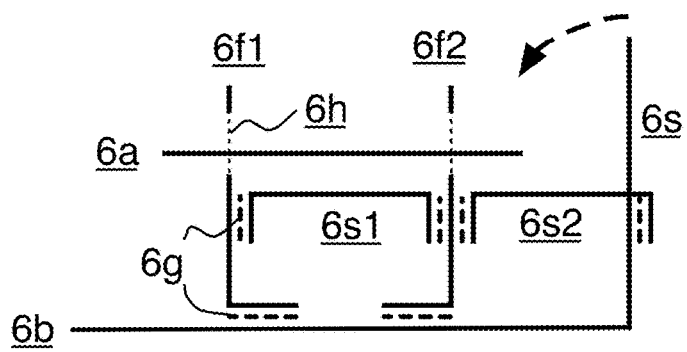
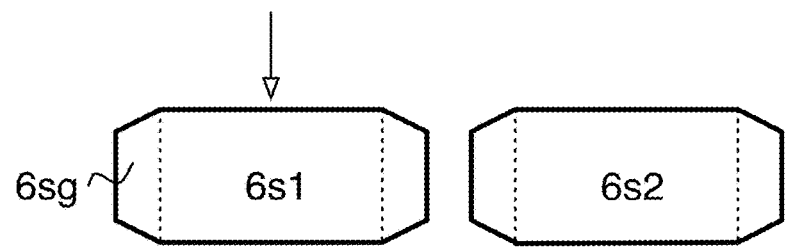
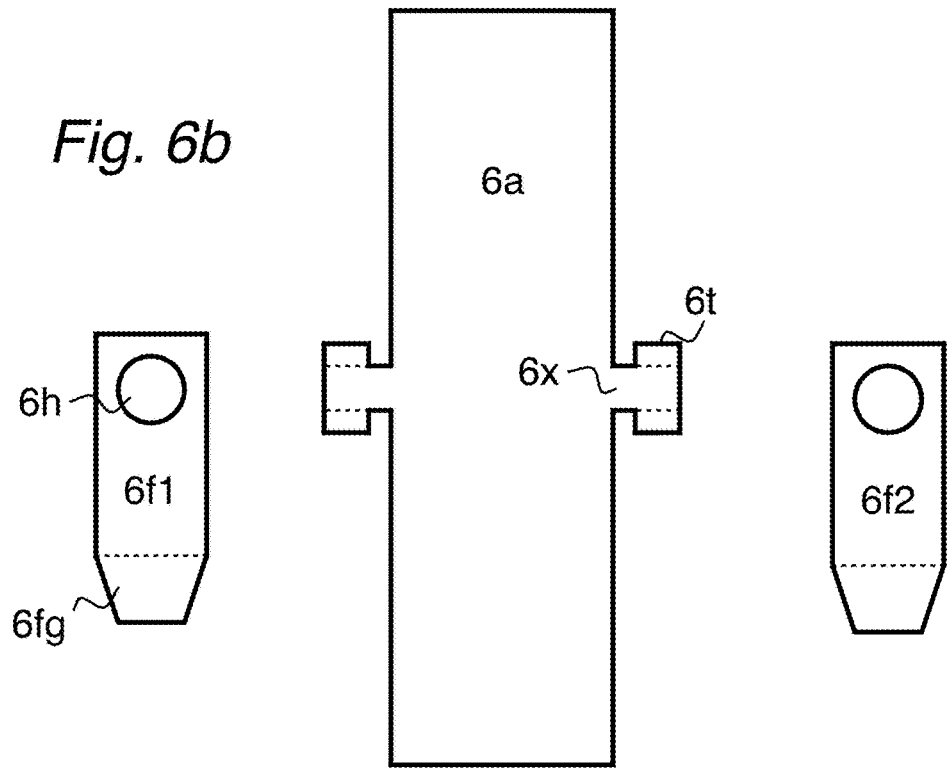

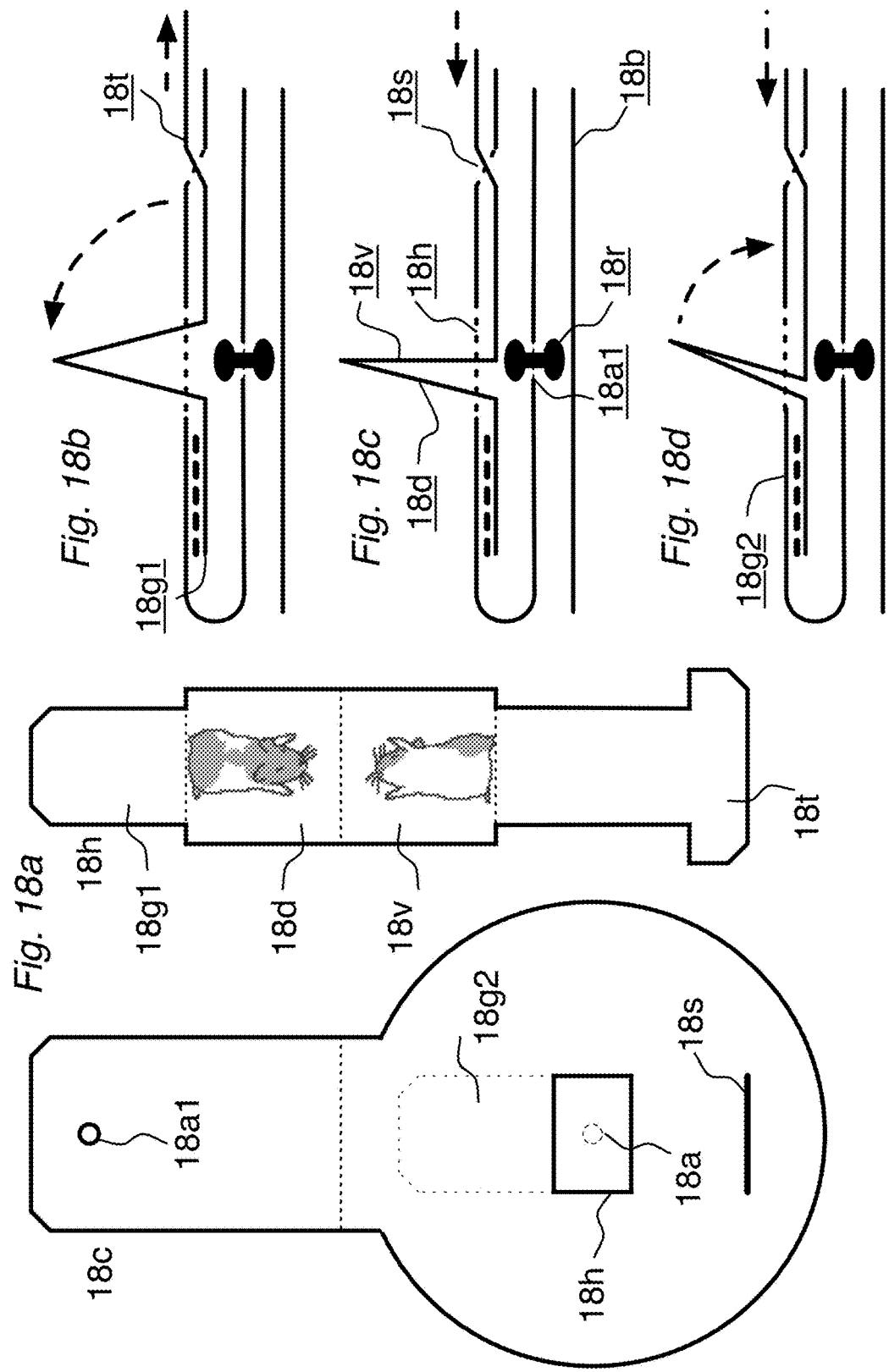

FOLDABLE PLAY ENCLOSURES

CROSS-REFERENCE TO RELATED APPLICATIONS

This application claims the benefit of priority of U.S. provisional application Ser. 61/922,503, entitled Portable Pop-up Habitat/Playpen for Small Pets, filed Dec. 31, 2013, the contents of which are incorporated herein in their entirety.

TECHNICAL FIELD

This invention relates to temporary enclosures for animals, and more particularly to play enclosures that can be folded flat for storage.

SUMMARY OF THE INVENTION

The present invention provides a foldable play enclosure that can be used to confine and provide enrichment. The side panels can be raised to provide the enclosure or be lowered so the enclosure folds flat for storage. The enclosure can have attached play elements using paper-engineering techniques so the elements are lifted into position when the panels are raised, then fold flat when the enclosure is closed. Support elements can be used to keep the panels in place, and offer locations for additional play elements. The invention also provides multiple enclosures configured like the leaves of a book or a Z-fold to provide a wider variety of play elements. The invention also provides methods for assembling, folding, and using the enclosures with small animals and infants.

BRIEF DESCRIPTION OF THE DRAWINGS

FIG. 5 illustrates an enclosure (5$a$) and various play elements. The tunnel element (5$t$) has attachment means (5$tv$) that can be removably attached in various configurations to attachment means (5$tw$) on the base or side of the enclosure. The portcullis (5$p$) element can be folded along 5$pf$ so that the cut-outs (5$g$) form a grate pattern. When inserted into overhead slot 5$s$ and lowered, the portcullis secures hole 5$h$1 while offering a barred view out the enclosure. Draw-bridge element 5$d$ provides a doorframe around opening 5$dh$ that corresponds to an opening 5$h$2 from the interior of the side panel. Accordingly, bridge portion 5$b$ can be lowered or raised, and if desired, reversibly secured by attaching means 5$bv$ to 5$bw$.

FIG. 6$b$ depicts the components of a see-saw assembly that serves as a play element. The plank (6$a$) has foldable tabs (6$t$) that form a reinforced axle (6$x$). Fulcrum elements 6$f$1 and 6$f$2 each have a hole 6$h$ so that the two, standing in parallel, can serve as the axle housing for 6$a$. Spanning pieces 6$s$1 and 6$s$2 are also provided, with representative tabs for attachment (6$sg$). FIG. 6$a$ provides a schematic representation when viewed along the direction of the open-headed arrow, although not to scale. As shown, the axle of plank 6$a$ is supported by the holes (6$h$) of 6$f$1 and 6$f$2, each of which is glued (6$g$) via their glue flaps (6$fg$) to the base panel (6$b$). The fulcrum elements are spaced and held upright by bridging support element 6$s$1, which has glue flaps (6$sg$) for attachment (6$g$). Similarly, one fulcrum element is spaced and attached to a side panel 6$s$ by a second bridging support element 6$s$2. When the side panel (6$s$) is raised relative to the base (6$b$) as represented, the see-saw assembly is raised into functional position and supported so the plank can be moved. When the side panel is lowered 90 degrees, indicated by the dashed arrow, the entire assembly is designed to fold down so it lies flat.

FIG. 8$a$ is a schematic representation of the bridge assembly where the tower elements (8$t$1, 8$t$2) are supported by insertion through the base panel (8$b$) and gluing (8$g$) the underside. The tower elements are spaced and further supported by elements 8$c$1, 8$c$2, and 8$c$3. Ramp elements 8$r$1 and 8$r$2 are positioned to provide access to the openings 8$h$ in the tower elements and secured to the base panel (8$b$) with flaps (8$bf$).

FIG. 18a depicts a pop-up, rotating play element with elements 18h and 18c. FIGS. 18b, 18c, and 18d are schematic cross-sections showing the play element in different stages of pop-up and folding down for storage.

DETAILED DESCRIPTION OF THE INVENTION

Animal owners need a fun, safe, portable environment to interact with their small pets. Previous attempts to solve this problem could not be folded easily for storage, or lacked elements to provide enrichment for the pets. Some products designed for birds were not designed for containment (i.e. the bird could hop out even without using wings). As the surrounding edges of the bird product were only about one inch tall, small mammals such as hamsters could easily escape. Other products, such as certain animal carriers, provided secure containment, but prevented the owner from meaningful interaction with the animals. Thus, a need exists for an environment that is space-saving, easy to set up and take down, and easy to clean. In a particular embodiment, the present invention provides a habitat/playground for small animals that pops up and folds down, similar to large, single-spread pop-up book. Pop-up books, however, do not provide side panels to prevent the animal from straying off the page. Thus, the present invention meets this need and provides related advantages as well.

Figure 1:
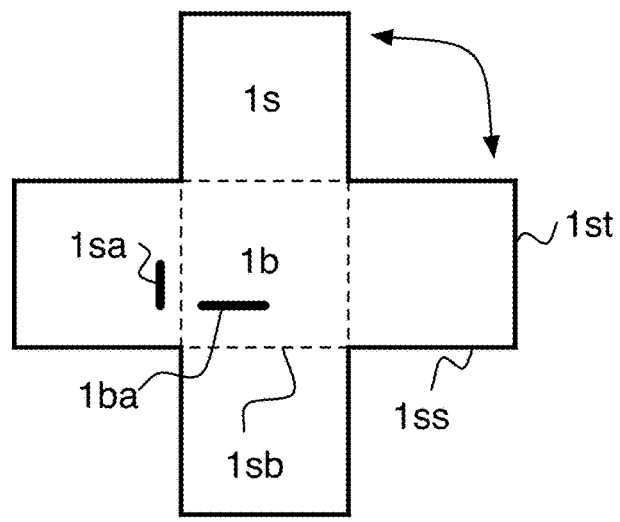
FIG. 1 shows a schematic diagram of a four-sided enclosure with a base panel (1$b$) and four side panels (1$s$). In general, solid segments indicate lines to be cut; dashed segments indicate lines to be folded. As shown, the bottom edge (1$sb$) of a side panel is foldably attached to an edge of the base panel. The top (1$st$) and side (1$ss$) edges of a side panel are also indicated for reference. The double-headed arrows indicate that the side edges of adjacent side panels can be attached. Representative locations for attaching optional play elements are shown on the base panel at 1$ba$ and on a side panel at 1$sa$.
Figure 2:
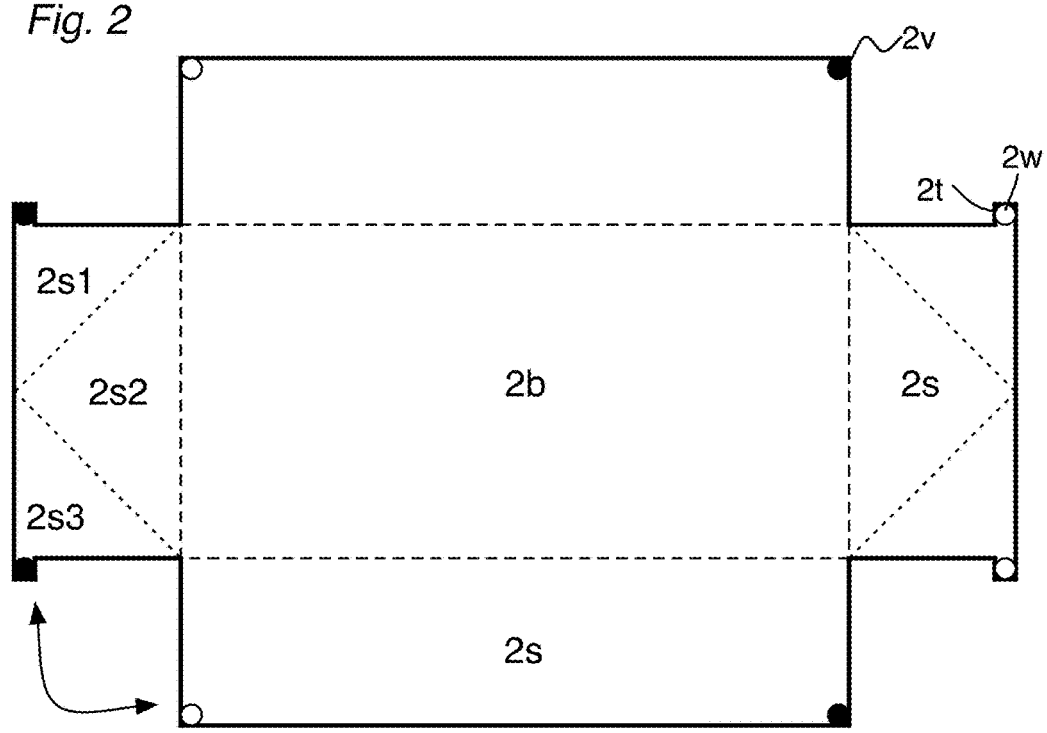
FIG. 2 shows an enclosure with a base panel (2$b$) where side panels (2$s$) can be divided into two or more subpanels, such as 2$s$1, 2$s$2, and 2$s$3. Also shown are attachment means such as pairs of 2$v$ and 2$w$, some of which are located on tabs (2$t$) to facilitate attachment of a side edge of 2$s$3 to a side edge of 2$s$.
Figure 4:
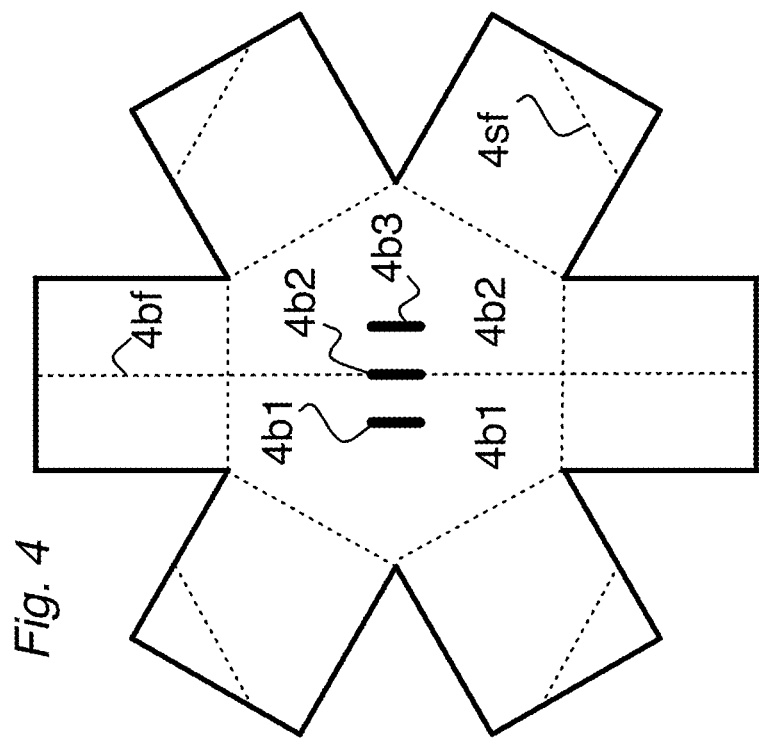
FIG. 4 depicts an enclosure where the base is divided by a fold (4$bf$) into base subpanels 4$b$1 and 4$b$2. Locations for attaching play elements are shown on either subpanel (4$b$1, 4$b$3) or along the fold (4$b$2). A fold line (4$sf$) is also shown for the side panels when the enclosure is completely folded.
Figure 3:
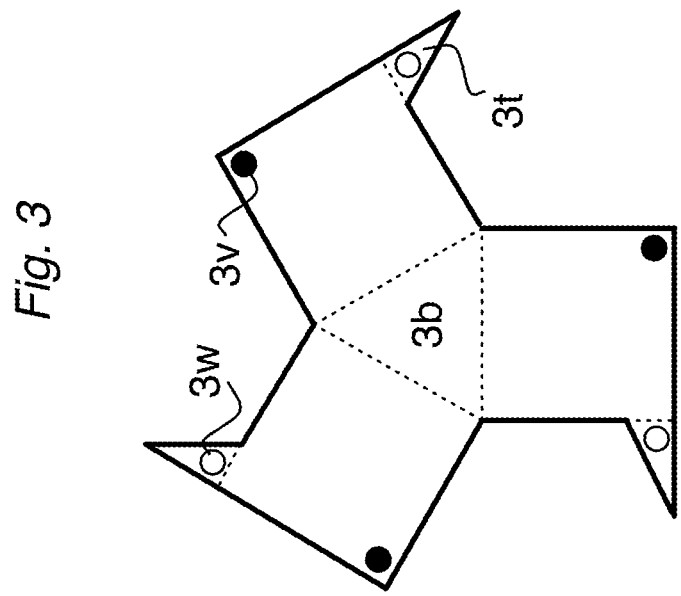
FIG. 3 depicts a regular hexagonal enclosure where the base (3$b$) has three sides. Tabs (3$t$) are provided with means (3$v$) for attachment to corresponding attachment means (3$w$).
Figure 9:
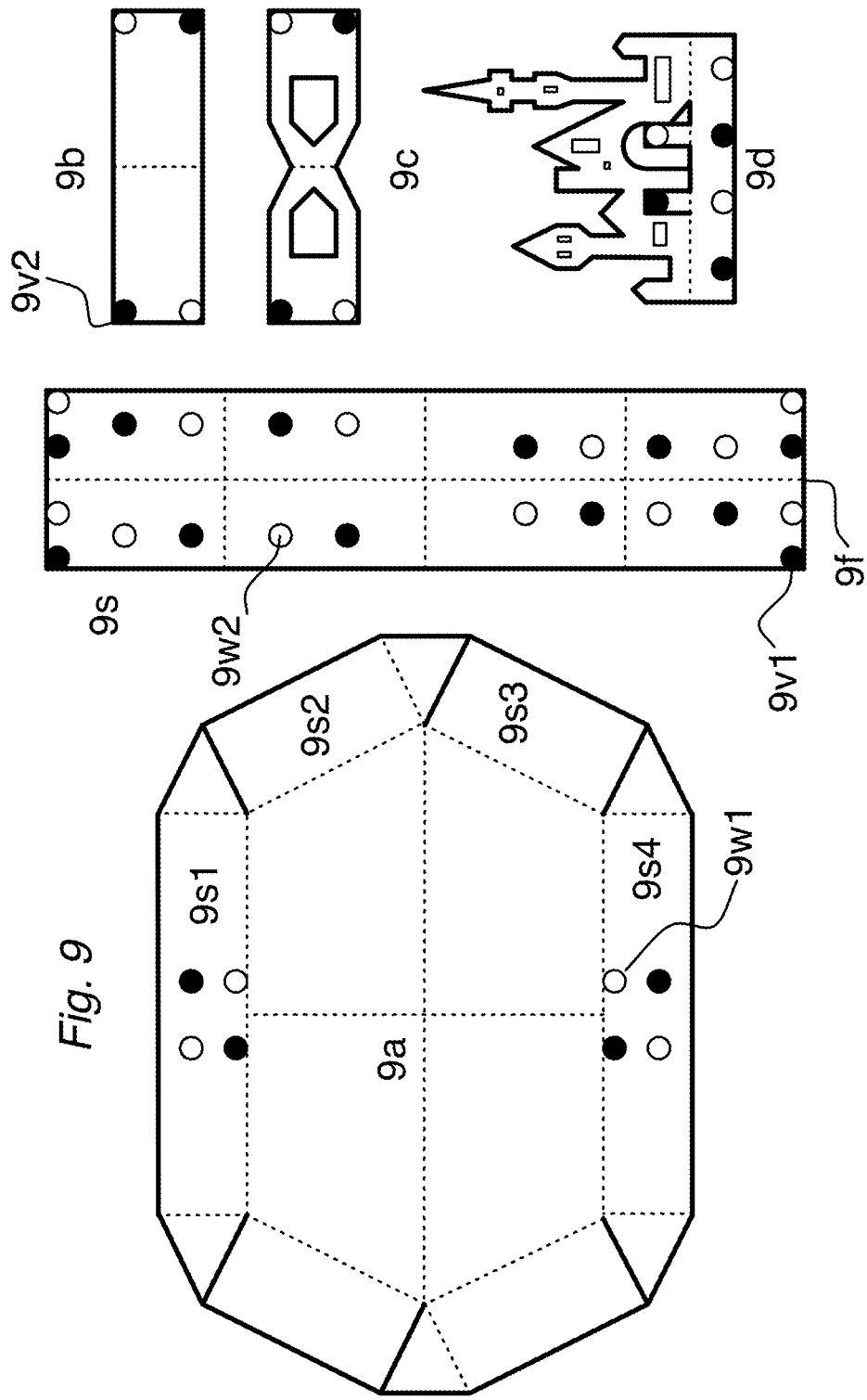
FIG. 9 shows an oblate hexagonal enclosure 9$a$. A support piece (9$s$) is provided that can be folded (9$f$) and used to keep the side panels (9$s$1, 9$s$2, 9$s$3, 9$s$4) of the enclosure in a raised position by attaching means 9$v$1 to corresponding means 9$w$1. In addition, the attachment means (9$w$2) of the support piece can be used to support removable, peripheral play elements, such as 9$b$, 9$c$, and 9$d$ by corresponding attachment means (9$v$2).

The invention provides a foldable enclosure with a base panel (1b) and at least three side panels (1s). Base panels useful in the invention have at least three edges, such as a triangle (FIG. 3) and more commonly four edges forming a square (FIG. 1) or rectangle (FIG. 2). Base panels with six edges are illustrated in FIGS. 4 and 9. Pentagonal, octagonal, and higher n-gonal base panels are within the scope of the invention. The edges of the base panel are typically straight to allow continuous attachment to side panels, although the edges may be curved as long as it is allowed by the attachment and folding geometry. A base panel can have relatively rigid subpanels that allow the base panel to be folded, as in 4bf or 9a.

Side Panels

Side panels are provided to form the side surfaces of the enclosure. For purposes of description, a side panel can be described when the largest surface is oriented in a relatively vertical orientation (as in 6s or 10s) or "raised" position relative to the base panel. In the raised orientation, a rectangular side panel can be described as having a lower edge, two side edges, and an upper edge. When a side panel is triangular, however, it is understood to have a lower edge and two side edges. When a side panel is in a relatively horizontal position, the terms "upper" and "lower" should be understood to refer to the edges when the same panel is in raised orientation.

An enclosure will generally have at least as many side panels as the number of base panel edges. The lower edge of each side panel is attached to at least a portion of the edge of the base panel. The attachment should be secure and continuous without leaving gaps between the side panel and the base panel, but flexible enough to allow the side panel to be raised or lowered relative to the base panel, hence "foldably attached." Examples of foldable attachments include simple folds in the material of the panels, or tabs of one panel inserted into a slit in another panel, and panels attached by material, such as tape or fabric or, by some adhesive, such as glue.

Figure 10:
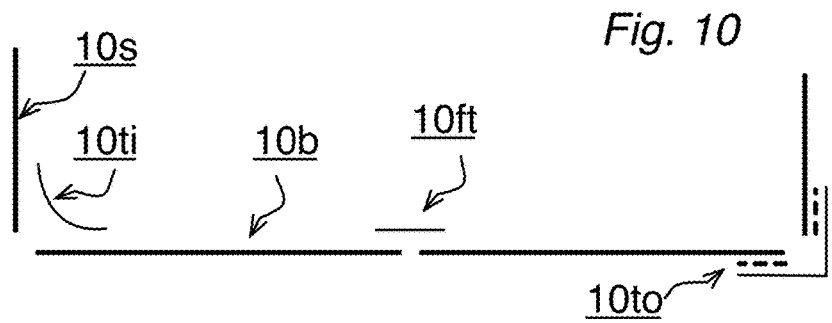
FIG. 10 is a schematic side cross-section of an enclosure, showing the laminated upper surface of the base panel (10$b$), the laminated inner surface of a side panel (10$s$), and an interior foldable attachment element (10$ti$) that is resistant to liquids and semisolids. In an alternate configuration, the laminated interior surfaces can be joined by an outside attachment element (10$to$). A foldable attachment (10$fi$) for the base panel is also shown, corresponding to a base fold like 4$bf$.

A foldable attachment is shown in FIG. 10, where 10ti indicates fabric that is attached to the inner sides of the base and side panels. A foldable attachment is also shown in 10to where the fabric is attached to the outer sides of the panels.

Simply unfolding or opening the device creates tension on internal elements, raising the side panels. When the side panels are raised, the surfaces of the side panels and the upper surface of the base panel typically form a continuous interior boundary surface with at least the lower part of the side panels. The lateral faces of the interior surface are formed by the surfaces of the side panels, which can be attached to adjacent side panels via their nearest side edges. The presence of some play features on side panels, such as openable doors or small windows, may result in minor areas of discontinuity that are reversible or above the level of the base panel, but they should not interfere with the boundary provided at the lower levels of the sides. When used with small animals or infants, the raised boundary deters escape beyond the side panels. When the enclosure is not in use, the side panels can be lowered so the enclosure lies flat.

Attachment Means

In some embodiments, the side edges of the side panels are permanently attached and the panels can be lowered by unfolding extra material or subpanels attached to the side edges. For example, a panel (2s) can be attached to adjacent panels, but can be folded into subpanels (2s1, 2s2, 2s3), so the side panel can be lowered. As with the subpanels of the base panel, the subpanels of a side panel can be any shape, but are often triangular to preserve the rigidity of the subpanel. More frequently, the subpanels are in the shape of right triangles.

In other embodiments, the edges of the side panels can be attached at will to hold the side panels upright and for added safety and stability, or detached by the user to fold the enclosure down. For example, the entire side edge of a side panel can be clipped to the side edge of an adjacent side panel; a zipper or resealable plastic-bag zip-lock can also be used. The edges of the side panels can have reversible attachment means, such as magnets, hooks, hook-and-loop fasteners, snaps, or buttons. More heavy-duty attachment means can be used, such as zip-ties, metal or plastic rings, or carabiners. In many cases, the attachment means are paired, so that a magnet (such as 3v) is positioned and magnetically oriented to attach to a corresponding means (such as 3w) for optimal attachment of the side panels with no gaps. Tabs (such as 2t, 3t) can be provided to secure and facilitate positioning of the attachment means. Another reversible attachment is a length of string, ribbon, or fabric to allow adjacent side panels to be attached by making a temporary loop or tying a knot.

Play Elements

The invention also provides enclosures that have at least one play element, which can be raised when the enclosure is opened and that folds down when the enclosure is closed, hence "reversibly collapsible". Play elements disclosed herein include a ladder (8r), a raised platform (7l), a ramp (7r2), a slide (7r2d2), a staircase (7s), and various tunnels (5t, 11ts, 11tb). Other playground elements, such as free-standing climbing walls, jungle gyms, small windows, rope ladders such as nets and Jacob's ladders, pulley-lifted platforms, swings, and tightropes, etc. may provide exercise and diversion for the pet, as long as, alone or combination, they do not serve as a means of escape. Further elements are described in more detail below. These elements allow the owner to observe, entertain, and interact with the pet from above the enclosure.

Geometry

Some play elements are attached to the base panel at one point and to a side panel at another point. For example, the see-saw assembly in FIG. 6a is attached to the base 6b and to the side panel 6s. When the side panel is moved into the raised position (90 degrees relative to the base panel 6b), the same motion raises the assembly into place. When the side panel is lowered, the assembly "collapses" or folds flat (0 degrees relative to the base). Accordingly, this type of element can be described as having a 90-degree range of motion. Other play elements, such as the bridge assembly in FIG. 8a can be attached to the base panel at two points, typically straddling a fold in the base panel (such as 4b2) so that one attachment point is on one base subpanel and the other attachment point is on another base subpanel (such as 4b1, 4b3). The bridge assembly is shown with the base subpanels fully opened (180 degrees), but can be folded closed (0 degrees), thus this and similarly attached elements have a 180-degree range of motion.

Points of Attachment

The points of articulation between parts of the play elements and the base or side panels can be attached by any method as long as the element can be raised or folded repeatedly as the panels are opened and closed. In the figures, the attachments are typically shown by a "glue flap" (such as 6fg) where a portion of one piece extends toward the other piece and is glued in place. For example, glue flap 14s attaches to a side panel, glue flap 14b attaches to a base panel, while other flaps, such as 14f are not attached and are primarily decorative.

The term "glue" is a term of art used herein for convenience to mean any adhesive or form of sealing, bonding, or cementing between the surfaces of two separate pieces. Other forms of sealing are discussed below. The term "glue flap" then is used to refer to a projection from one piece that provides a surface that can be glued, at least in part, to the surface of another piece. For example in FIG. 6, fulcrum piece 6f1 has a projecting portion 6fg, which functions as a glue flap. When the fulcrum piece is attached to the base panel 6b, the glue flap is folded parallel to the base panel and "glued," so the flap is immobilized on the base panel.

Figure 11:
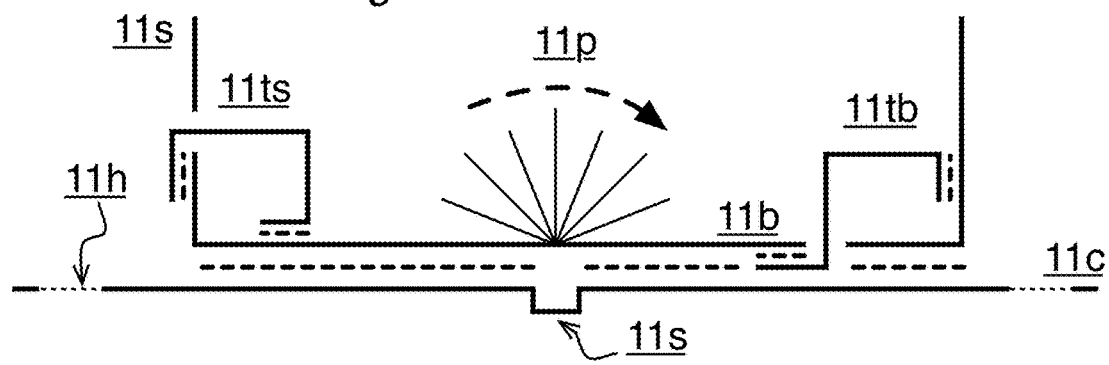
FIG. 11 shows a schematic cross-section showing tunnel-type play elements (11ts, 11tb) that can be attached to the enclosure where elements pass through a side panel (11s) or a base panel (11b). The attachment locations are shown with broken thick lines. A plurality of pages 11p can be attached to a fold of a base panel 11b, and positioned to provide additional artwork or play features as they are turned like pages of a book. If desired, an outside cover 11c can be attached to the base panel 11b, with optional open handles 11h, with an optional book spine 11s to provide flexibility.

The flexible fold connecting a glue flap to the rest of the piece allows the piece to be raised or folded repeatedly. The glue flap can be attached directly to the interior surface of a panel, or can pass through a slot in the panel and be attached on the exterior surface of the panel. For example, FIG. 11 shows tunnel element 11ts with a first flap glued to the upper surface of the base panel (11b) and a second flap passing through side panel 11s to be glued on the exterior surface of the side panel. Similarly, tunnel element 11tb shows direct attachment to the side panel and passing through under the base panel 11b for attachment.

Other flaps can be used to provide functionality, such as a small tab (15t) to limit or prevent free movement or swinging of a door (15d), or an extended portion serving as reinforcement (15r) for a hinge (15h). Yet other flaps can simply be primarily decorative (17r).

Doors

While play elements described above rely on movement of the side or base panels to provide action, another type of play element is a door in a side panel. Typically, the side panel will have a hole that is reversibly closeable so that the enclosure provides a continuous internal barrier, but can be opened by the owner when desired. In FIG. 5, a doorway is formed by hole 5h1, which can be closed by lowering portcullis element 5p through slot 5s. Another door arrangement is shown with 5d, which can be attached to the side wall to frame doorway 5h2. In one embodiment, the drawbridge portion 5b can be raised so that magnets 5bv attach to corresponding magnets 5bw, closing the door. If a single drawbridge element is not enough to secure doorway 5h2 against habitual escape artists, a back-up drawbridge can be provided for the exterior side of the side panel.

See-Saws

A particular play element is a see-saw, as exemplified by the assembly in FIGS. 6a and 6b. A board (6a) is provided with axle portions (6x) extending away from the middle of the board on opposite sides. If desired, the axle portion can have a folding tab (6t) to provide girth and avoid deflection during use. Fulcrum elements (6f1, 6f2) are provided with facing holes (6h) to form an axle housing to receive the axle portion of the board. The holes should be wide enough to permit insertion of the axle, but not hinder free movement of the axle within the housing. The fulcrum elements should spaced to accommodate the width of the board but not so far apart that the axle slips from the hole during play. Support element 6s1 is provided then to separate the fulcrum elements by an optimal distance, and support element 6s2 is provided to secure the assembly to the side panel (6s) for motion. As shown, the assembly provides a functional see-saw when the side panel is raised 90 degrees, and collapses when the side panel is lowered.

Platforms

Figure 7:
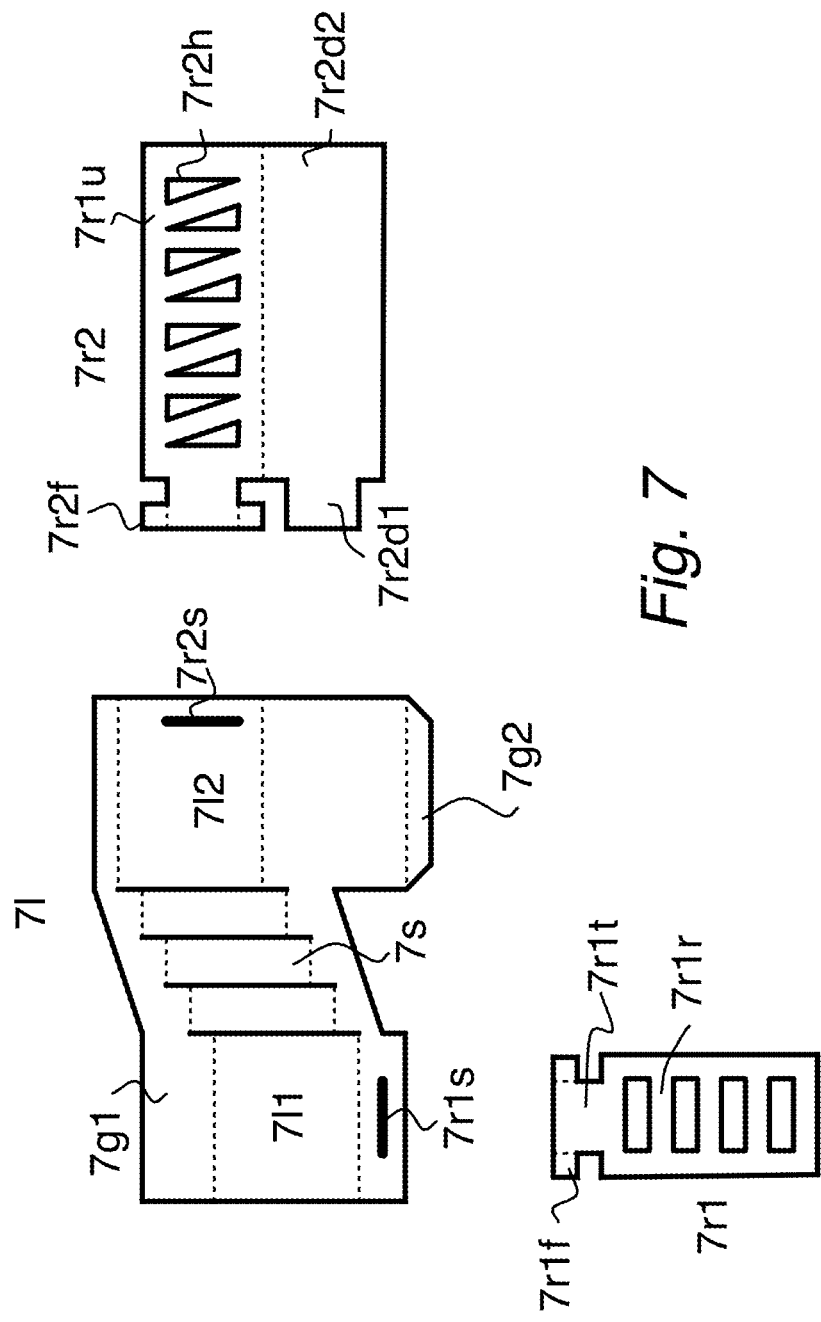
FIG. 7 depicts a split-level assembly with a landing unit 7$l$ that has a lower landing (or mezzanine) 7$l$1 and an upper landing 7$l$2, connected by stairs 7$s$. A first ramp 7$r$1, having rungs 7$r$1$r$ can have flaps 7$r$1$f$ so the tab 7$r$1$t$ can be inserted into slot 7$r$1$s$, providing access from the base panel to the mezzanine. Similarly, second ramp 7$r$2 is shown having a reinforcing lower layer (7$r$2$d$2) that can be folded under upper portion 7$r$2$u$, which has holes 7$r$2$h$ to provide a non-slip upper surface. The second ramp has flaps 7$r$2$f$ that can be folded for tab-insertion into slot 7$r$2$s$ of the landing unit. The lower layer has a corresponding tab 7$r$2$d$1 to strengthen the tab of upper portion (7$r$2$u$).

Another play element is the split-level assembly depicted in FIG. 7. Part 7l has glue flaps 7g1 and 7g2 to attach to the side and base panels, allowing the assembly to be raised by a 90 degree motion. The assembly connects one landing (7l1) via stairs (7s) to an upper landing (7l2). An optional first ramp 7r1 provides climbing access from the base panel to the lower landing (7l1). An optional second ramp 7r2 descends from the upper landing to the level of the base panel. As exemplified in the figure, the ramps can have features such as rungs (7r1r) for climbing, holes (7r2h) on one side to provide a non-slip surface, or the ramp can be flipped over to serve as a slide (7r2d2). If desired, another part 7l (or its mirror image) can be provided, with catwalks connecting one landing to another.

Bridges

Figure 8:
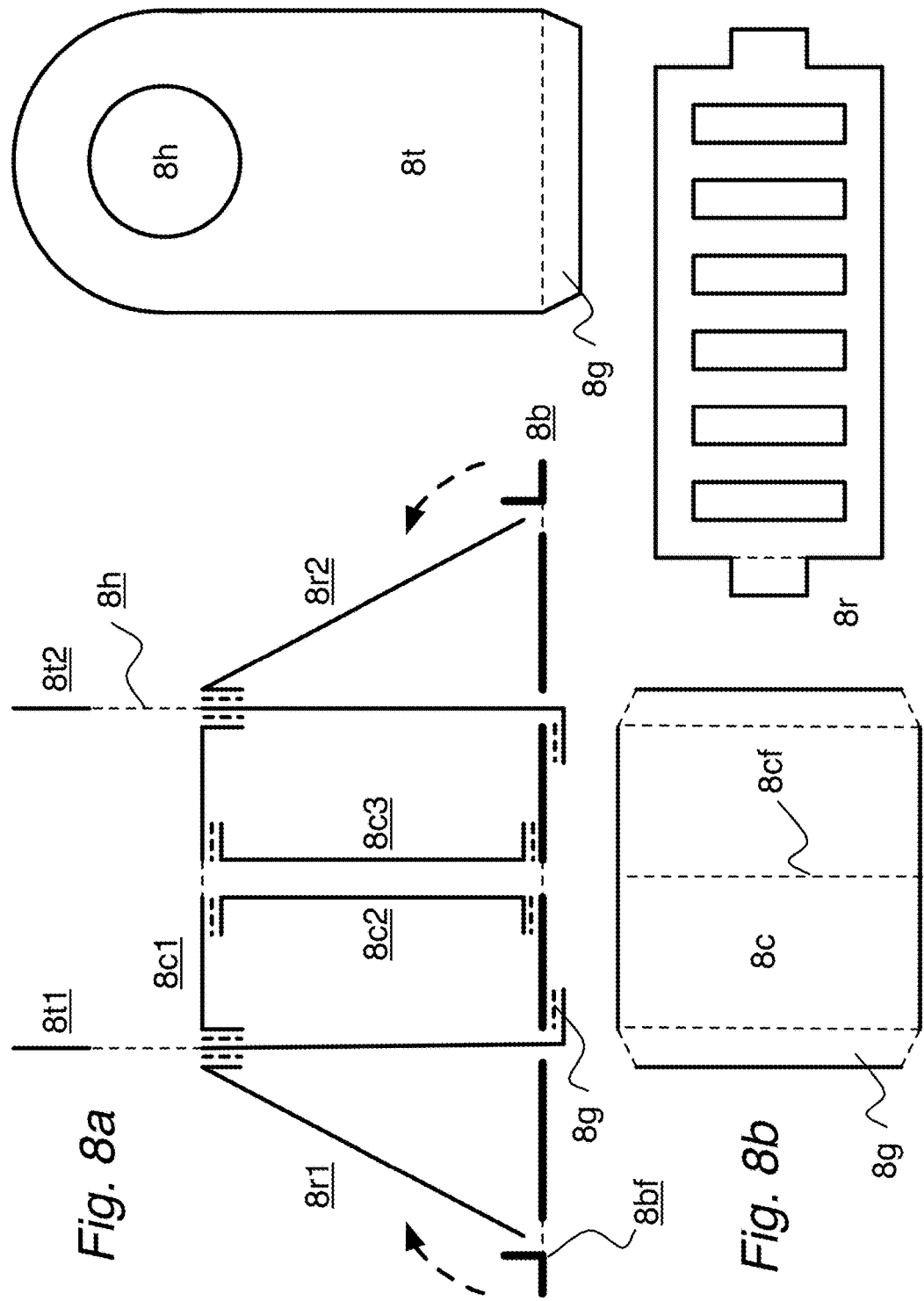
FIG. 8$b$ depicts a bridge assembly of tower elements (8$t$), support elements (8$c$), and ramps (8$r$).

A further play element is a bridge assembly having at least two vertical tower elements and at least one support element connecting the tower elements. When attached to different base subpanels at locations such as 4b1 and 4b3, the assembly straddles base fold bf4, so that it can fold down, but forms a bridge when the base subpanels are opened 180 degrees. FIG. 8b illustrates tower elements 8t1 and 8t2, each having a portal (8h). A support element (8c) is provided herein that can serve multiple functions in an assembly. As 8c1, the support element spans the distance between the tower elements. Elements 8c2 and 8c3 then provide vertical support to a foldable midline (8cf) of 8c1. Glue flaps (8g) are shown throughout for these elements. The configuration of the tower and support elements as shown form an armature for the entire assembly that can be folded down and raised by simply opening and closing the base subpanels.

Ramp elements 8r are positioned to provide access the tower portals (8h). The ramps can be attached in any way that does not interfere with the action of the armature. For example, the upper end of a ramp can be attached to the tower element, leaving the lower end free to slide along the base panel. Optionally, the lower end of a ramp can be tucked by the user under a flap (8bf) provided on the base panel. Alternatively, the lower end can be attached to the base panel, so the ramp slides up and down the tower. As specifically exemplified in FIG. 8a, a small animal can start from the level of the base panel (8b), climb up the first ramp (8r1), through the portal (8h) of the first tower (8t1), across the mediating support element (8c1), reaching the portal of the second tower (8t2), down the second ramp (8r2), and descend to the base level (8b). It will be understood that the width and length of the support element 8c1 can be varied, and additional tower elements can be added for multi-span bridges. If desired, support elements 8c2 and 8c3 can have passages to provide underpass zones for sheltered rodent exploration.

Stages

Yet another play element is a stage assembly that provides a platform as a play area for pets, or as scenery for play with animals or suitably sized toys. By attachment to the base panel and a side panel, the stage is raised up. The stage can be in the form of a proscenium, with typical theater elements such as an arch, at least one backdrop, borders, legs, and tabs. Pop-up bleachers and theater boxes can also be provided to suggest the audience for a thrust stage or a theater in the round. The stages and audience elements can be attached to adjacent, facing or multiple side panels, or attached at different levels to provide multiple tiers of seating. Thus, an enclosure can be opened to instantly provide a rich and imaginative play environment, yet folded away for storage when not in use.

Rotating Platforms

A pop-up play element, such as one depicting a hampster (18h) can have a dorsal panel (18d) and ventral panel (18v), which is secured to a glue flap (18g1) at one end, and a push/pull tab portion (18t) at the other end. As shown in FIG. 18b, partially mobile element 18h can be threaded through element 18c so glue flap 18g1 is attached to a relatively immobile glue target area (18g2). Element 18h then passes up and down through hole 18h and through slot 18h. When the tab is pushed toward the panels, panels 18d and 18v are popped-up into raised position, as indicated by the dashed arrow. After play, the panels can be pinched together or tab 18t can be pushed toward the panels, or both, to begin folding the play element flat, as in FIG. 18c. The folding process continues in FIG. 18d, as indicated by the downward dashed arrow.

The play element can also rotate about a central axis (18a). In element 18c, an axis hole (18a1) is provided. A rivet element (18r), such as a top-off, can be positioned through the axis hole to allow free rotation of carrousel element 18c in relation to the base panel (18b). Accordingly, panels 18d and 18v can be raised, folded, and rotated by the user.

Additional fabric elements, including the ones discussed variously above, can be used as decorative items (16c) or can be used as means for providing tension between parts of one or more play elements. Other means include pull-tabs and levers to provide kinetic motion. Any of these can be further paired with wheels, rocker arms, and tracks.

Play elements are not limited to those described above, and can be implemented using techniques known in the art of paper engineering, which are described in instructional books such as Paul Jackson, *The Pop-Up Book* (1993); David A. Carter and James Diaz, *The Elements of Pop-Up: A Pop-Up Book for Aspiring Paper Engineers* (1999); Carol Barton, *The Pocket Paper Engineer: How to Make Pop-Ups Step-by-Step* (3 vols. 2005, 2008, 2012); Rob Ives, Paper Engineering and Pop-ups for Dummies (2009); Paul Jackson, *Cut and Fold Techniques for Pop-Up Designs* (2014).

Supplementary Side Support

When the enclosures of the invention are opened, it can be advantageous to provide supplementary means of support to keep the side panels in an upright position. This can be in the form of one or more rigid beams or subpanels that reversibly cross the side panel along or across the edges to keep the side panel from undesirable folding. A support panel may be provided that can be any size as long as it lends stiffness to the side panel and does not interfere with the enclosure's use. In one embodiment the support panel is attached to a side panel having two or more subpanels at one or more select points or areas. For example, attachment to side panel 2s can be to points within 2s1, 2s2 or 2s3. In some embodiments, the individual attachment sites can be reversible, or a combination of permanent and reversible (such as to 2s2 and to 2s1 and 2s3, respectively). Alternatively, an area of the support panel can be attached to a subpanel, saving the reversible attachment for adjacent subpanels of the same side panel, as long as it does not interfere with the folding down of the enclosure or the folding of other play elements. Corresponding attachment means can be placed on the support panel and side panels to facilitate reversible attachment. Accordingly, a support panel can be removed or repositioned relative to the side panel when the enclosure is to be folded down.

Corral

A support panel can take the form of two subpanels attached to each other and that simply fold over the top edge (1st) of a side panel, with optional attachment means. More complicated support panels can take the form of multiple connected segments, as in 9s, which are folded along a center line (9f). In this embodiment, the folded panel has four segments than can be fitted over portions of the side panels of enclosure 9a, namely parts of 9s1 and 9s4, and all of 9s2 and 9s3. As shown, the support panel can have attachment means for snug fit with the side panels. The tensile strength of 9s keeps the side panels in a raised position by wrapping around the side edges of the side panels and keeping them from separating from each other.

Where a support panel is provided with various attachment means, as illustrated in FIG. 9, it can also serve as platform for peripheral play elements (9b, 9c, 9d) that can be reversibly attached along the inner and outer perimeters of the enclosure. The peripheral elements can be added, removed, and rearranged without interfering with the function of foldable play elements attached to the base panels. This functionality lends itself to themed sets of peripheral elements, which can be augmented with optional artwork.

Artwork

Other parts of the enclosure (walls, base, cover, play elements, doors) can have printed artwork for decoration, preferably thematically related to the play elements. For example, play elements in the shape of familiar monuments on the Capitol Mall, the Champs Elysees, or theme parks can be paired with artwork that provides background scenery from Washington D.C., Paris, or Anaheim, respectively. The ink used for the surface art can be non-toxic, such as soy-based inks Where a glue tab or other portion is to receive surface treatment, the artwork may be omitted in those areas so the ink does not interfere with the retention of the glue.

Lamination

When used with animals, it can be desirable for at least one surface of the base (10b) and side panels (10s) can be laminated, such as synthetic or laminated water-proof paper so the interior surface will be waterproof and easily cleaned with a damp cloth. In some cases, the foldable attachment can be provided within the interior surfaces (10*ti*). In other cases, a surface must be laminated entirely, so it is preferable to provide a foldable attachment by contact to the exterior surfaces (10*to*). Thus, the foldable attachments between panels can be configured so the interior surfaces of the enclosure are resistant to liquids and semisolids, such as animal urine, feces and scent secretions.

Cover

An enclosure can be attached to an outer cover, which provides support and protection for the base panel. As exemplified in FIG. 11, cover 11*c* is attached to base panel 11*b*. The cover allows pass-through tabs (such as in 11*tb*) of the base to be concealed. As the base panel is to be folded 180 degrees, the cover can have a book-spine-type hinge (11*s*) to allow the base panel to fold in accordance with the invention. If desired, the cover can have one or two openings (11*h*) that serve as convenient handles when the enclosure is folded closed.

If desired, a temporary top cover can be placed over the unfolded enclosure, with optional attachment means to provide further structural reinforcement for the side panels. The top cover can be opaque to provide shade to light-sensitive animals, preferred darkness to nocturnal animals, or privacy. In a preferred embodiment, the cover is a one-way mirror to serve these functions from below, but is somewhat transparent so the pet can be observed above.

Configurations of Multiple Enclosures

Figure 12:
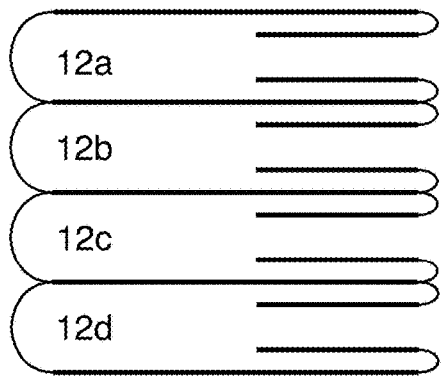
FIGS. 12 and 13 show multiple enclosures in book configuration (enclosures 12a, 12b, 12c, and 12d) and Z-fold configuration (13a, 13b, 13c, and 13d).
Figure 13:
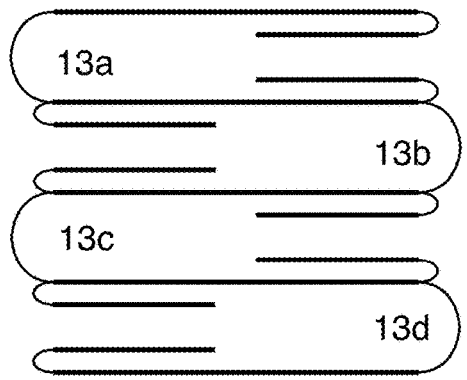
Figure 15:
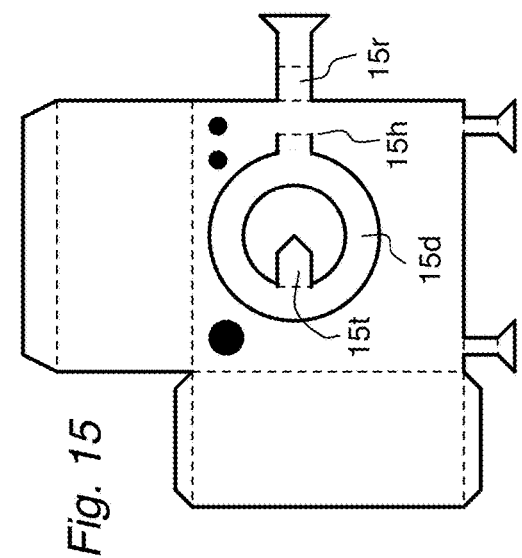
FIGS. 14, 15, 16, and 17 depict themed play elements that have 90-degree range of motion.
Figure 17:
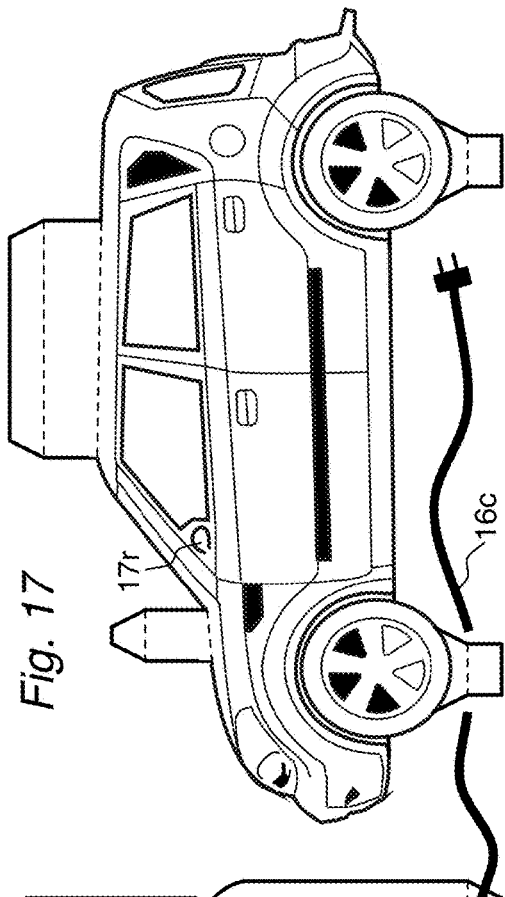
Figure 14:
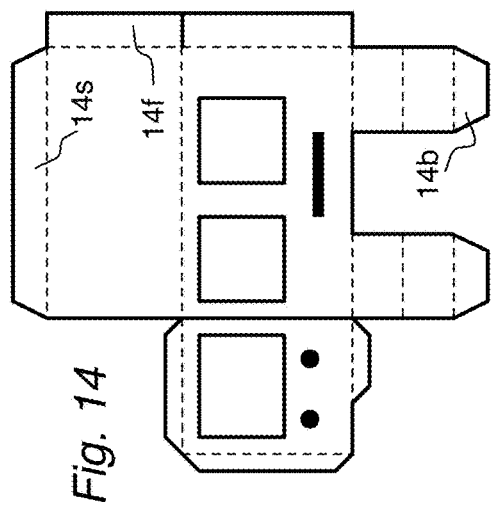
Figure 16:
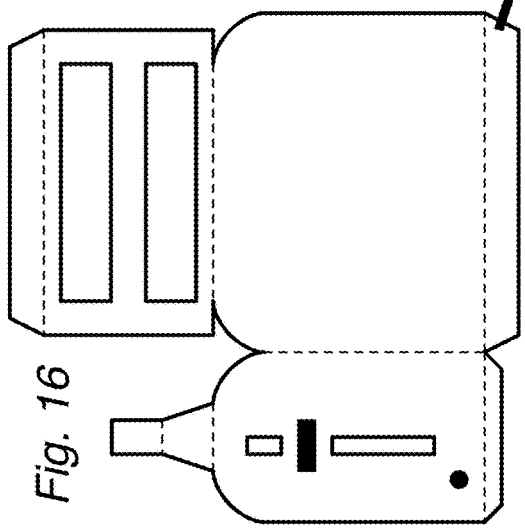

If desired, two or more enclosures of the invention can be attached to one another via doors or covered corridors to provide multiple enclosure and enrichment environments. Thus, a first enclosure can be raised to provide a first environment for play, then closed. Then a second enclosure can be unfolded for play and closed, and so on in series. The individual enclosures can be attached, for example, in the form of a book (FIG. 12) with leaves (12*a*, 12*b*, 12*c*, and 12*d*), or in a Z-fold (FIG. 13) with panels (13*a*, 13*b*, 13*c*, and 13*d*). As represented in schematic side view, these figures do not depict the thickness of the panels and attachments to scale, but are intended to provide representative geometries for attachment. In practice, paper engineering techniques, such as attachments of suitable width or supplemental base panels, enable the enclosures to lie flat one at a time. Thus, the invention provides configurations of multiple enclosures to provide a series of play environments that can be experienced by the animal as an unfolding montage of tableaux.

Methods for Making

The present invention also provides methods for making the enclosure. The panels can be printed with the desired surface artwork, and then die-cut. In this process, a steel and wood die can be made according to a final die design. The die maker preferably nests the individual pieces on the material to optimize the surface area and sheets of material to be cut and used for the enclosure.

The material can be paper, construction paper, cardstock, or any similar flat material that can be folded repeatedly without separating or tearing. Particularly useful materials include synthetic papers, that are commercially available from Yupo Corporation (Chesapeake, Va.) for example, that have desirable properties as being waterproof, tear-resistant, opaque or transparent, and available in a range of thicknesses for durability. Another synthetic material is flashspun high-density polyethylene fibers, such as TYVEK (DuPont, Wilmington, Del.), which can be cut into desired shapes, but is essentially tear-proof. Other useful materials include hides (such as natural or artificial leathers) and fabrics, including textiles from natural, artificial, or a mixture of fibers, which can be used specifically as a durable means for connecting adjacent side panels.

The pieces can be attached with the foldable material, such as tape, or tabs that are glued with adhesive to other pieces. Heat-sealing, dielectric bonding, and ultrasonic sealing can also be used. For synthetic material, the pieces should be attached according to the manufacturer's recommendations, for example starch, dextrin, casein, and animal-based adhesives over synthetic-based adhesives. Other useful adhesives for synthetic materials include water-based synthetic lattices, ethylene/vinyl acetate, acrylic tape, solvent-based polyurethane and hot glue.

The enclosure can be made in an unfolded state for initial assembly. Typically, the enclosure is unfolded or opened so certain play elements can be attached, such as by inserting tabs (such as 7*r*1*t*) into slots (such as 7*r*1*s*), before, during, or after the panels are being assembled. The enclosure is then folded or closed, so that other elements can be attached. Depending on the complexity of the play elements, the process is repeated to attach each element or additional pieces of each assembly, to allow the glue to set, to check the alignment of the glued pieces and artwork. After all the pieces have been assembled and glued, the enclosure is opened and closed to ensure each play element is raises and collapses reliably. The enclosure can then be refolded for packaging and shipping. If desired, further artwork can be placed on or over the closed enclosure in a separate sheet or cover for retail display.

Methods of Use

The present invention further provides a method for using the enclosures described herein. To use the invention, a person simply needs to open/unfold the device (similar to opening a book or a briefcase) causing the walls and elements to spring into place. When all components are in place, the unit opens (pops up) and closes in one swift motion, similar to a spread in a pop-up book.

Tension is placed on the walls and elements by opening and closing the side panels by the pop-up action of the device. Upon opening the enclosure by raising the side panels, one or more animals can be placed in the enclosure from above onto the base panel for play and exercise. Optionally, a temporary top cover can be placed over the enclosure or attached to the top.

The animal can interact with the play elements attached to the base and walls of the opened device. If a configuration is provided of multiple enclosures, then the animal can be placed in another enclosure or allowed to move between adjoining enclosures. Doors built into the walls can be opened via pull tabs to allow exit/entry, as well as access to other enclosures that are lined up to be directly adjacent. The doors of enclosures can also be connected via covered corridors. After the user or animal is finished enjoying the enclosure, any cover can be removed, and the animal can be removed. Once removed, reversible attachments, such as the Velcro tabs, can be released to allow the walls and play elements collapse flat with the release of the tension on the panels. The enclosure can be folded flat, preferably cleaned, and ideally stored.

The enclosure is not limited to pets or other companion animals, but is suitable for use with any land-tolerant animal that is self-mobile. Particular animals include mammals, such as rodents (such as hamsters, mice, rats, chinchillas, gerebils, tree and ground squirrels, and prairie dogs), lagomorphs (such as rabbits, hares, and pikas), marsupials (such as sugar gliders and oppossums) and carnivores (such as dogs, cats, ferrets, and meerkats). The enclosures can be suitable for birds that are naturally flightless (such as kiwis and fairy penguins) or birds with clipped wings, such as domesticated ducks and chickens, or tame members of the psittacine (parrot) and corvid (crow) families.

Other animals include reptiles (such as lizards, snakes and turtles) and amphibians (such as frogs, toads, and salamanders). Arthropods include insects (such as beetles, praying mantises, crickets or Madagascar hissing cockroaches), spiders (such as tarantulas), scorpions (such as emperor scorpions), and crabs (such as hermit crabs), or even millipedes and centipedes. Yet other animals include annelids (worms) and molluscs, for example to be conveniently contained for ready access during fishing trips.

With all animals, the height of the side panels should be sufficiently high to prevent the animal from leaving the enclosure. For some animals, this can be higher than 0.5, 1, 2, 3, 4, 5, 6, 7, 8, 9, 10, 11, 12, 14, 16, 18, 20 or 24 inches, depending on whether animal is to watched attentively or left unattended for a period of time. However, to be able to place the animal within the enclosure, the height should not be so high that the animal will be dropped in, or so high as to prevent meaningful interaction with the user. For example, the height can be less than 6, 5, 4, 3, 2 feet, 1 foot, or less than 10, 6, 4, or 2 inches.

Use with larger animals or animals that can jump higher distances will preferably have proportionately larger base panels and higher side panels to provide secure enclosure. While some animals are reluctant to press against sides of enclosures, requiring panels that are slightly more rigid than self-supporting, other animals will require sturdier side panels, especially if the animal is to be left unsupervised for any amount of time. In such cases, it is also preferable that the panels and attachments be resistant to gnawing or digging, which are instinctive habits for many small animals. For this reason, the foldable attachments can be reinforced and the base and lower portions of the panels can be infused with nontoxic flavorants that discourage chewing, such as capascin or piperine.

Thus, the size of the enclosure will vary, depending on the animal and intended use, but in a particular embodiment, the enclosure, when folded, fits easily on a book shelf, and is portable. When opened, an enclosure can be the approximate size of a gaming board. The number and complexity of play elements will depend on the native intelligence of the animals to be placed in the enclosure, the number of animals and their relative sociality, territoriality, and desire for cover, and the development and attention span of the animals and users.

The enclosure is also suitable for enclosing a small human, such as an infant or toddler, as long as the height and materials of the enclosure are appropriate for age and mobility, and all other relevant health, safety and consumer standards are met. For example, it is desirable that enclosures having play elements intended for children under 3 years of age should not contain pieces that may be accidentally swallowed or provide other choke hazards. The enclosure is further suitable as a playhouse for dolls, play soldiers, action figures, marionettes, miniature cars and trains, or any other figurines.

The section headings used above are for ease of reference only, and are not intended to limit the contents of the disclosure under the headings or to suggest exclusion from other parts of the disclosure. Finally, it should be noted that the foregoing embodiments are merely intended for describing the technical solutions of the present invention, rather than limiting the present invention. Although the present invention is described in detail with reference to the foregoing embodiments, a person of ordinary skill in the art should understand that he or she may still make modifications to the technical solutions described in the foregoing embodiments, or make equivalent replacements to some technical features thereof, without departing from the spirit and scope of the technical solutions of the embodiments of the present invention.

We claim:

1. A foldable enclosure, comprising
   a base panel having at least three edges;
   a first set of at least three side panels, each having at least one lower edge and at least two side edges;
      wherein the lower edge of each side panel is foldably attached to an edge of the base panel;
      whereby the base panel, comprising a single planar surface, and portions of the side panels provide a continuous internal barrier when the side panels are in a raised position and when each side panel is attached to adjacent side panels; and
      whereby the enclosure lies flat when the side panels are in a lowered position; and
   a collapsible play element attached to the base panel.

2. The enclosure of claim 1, wherein the side edges of two adjacent side panels are reversibly attachable to each other.

3. The enclosure of claim 1, wherein at least two side panels are foldable into two or more rigid subpanels.

4. The enclosure of claim 3, further comprising a rigid support panel that supports a side panel from folding.

5. The enclosure of claim 4, wherein the rigid support panel is attachable to a side subpanel by reversible attachment means.

6. The enclosure of claim 4, wherein the rigid support panel is foldably attached to at least one side subpanel.

7. The enclosure of claim 1, comprising a reversibly attached set of segmented rigid support panels that maintain side panels in a raised position.

8. The enclosure of claim 7, wherein the rigid panels comprise peripheral play elements.

9. The enclosure of claim 1, whereby the play element can be raised or collapsed by moving one of the panels.

10. The enclosure of claim 1, wherein the collapsible play element is also attached to a side panel, whereby the play element can be raised or collapsed by moving the side panel.

11. The enclosure of claim 1, wherein the play element is selected from the group consisting of a ladder, a platform, a sandbox, a staircase, and a tunnel.

12. The enclosure of claim 1, further comprising a reversibly openable door.

13. The enclosure of claim 1, wherein the collapsible play element is a moveable see-saw assembly comprising a plank having a central axle that passes through the holes of two fulcrum elements.

14. The enclosure of claim 1, wherein the base panel is foldable into two or more rigid subpanels.

15. The enclosure of claim 14, wherein a play element is foldably attached to one subpanel of the base and foldably attached to another subpanel of the base, whereby the play element is raised when the subpanels are opened flat.

16. The enclosure of claim 15, wherein the play element is a bridge assembly comprising at least two vertical tower elements and at least one support element that is foldably attached therebetween.

17. The enclosure of claim 15, wherein the play element comprises pages attached to the fold of the base panel.

18. The enclosure of claim 15, wherein the play element is selected from the group consisting of a ladder, a platform, a ramp, a sandbox, a slide, a staircase, and a tunnel.

19. The enclosure of claim 14, further comprising a second set of side panels, wherein
   a first feature is attached to one surface of a base subpanel and to a side panel of the first set, and
   a second feature is attached to the other surface of the base subpanel and to a side panel of the second set.

20. The enclosure of claim 1, wherein the play element is a ramp or a slide.

* * * * *